(12) United States Patent
Joshi et al.

(10) Patent No.: US 6,785,423 B1
(45) Date of Patent: *Aug. 31, 2004

(54) PRODUCING A COMPRESSED DIGITAL IMAGE ORGANIZED INTO LAYERS HAVING INFORMATION RELATING TO DIFFERENT VIEWING CONDITIONS AND RESOLUTIONS

(75) Inventors: Rajan L. Joshi, Rochester, NY (US); Bernard V. Brower, Webster, NY (US); Majid V. Rabbani, Pittsford, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/579,996

(22) Filed: May 26, 2000

(51) Int. Cl.[7] .................................................. G06K 9/36

(52) U.S. Cl. ...................................................... 382/235

(58) Field of Search ................................ 382/235, 232, 382/240, 246–247, 251, 248; 358/1.2, 539; 325/240.11

(56) References Cited

U.S. PATENT DOCUMENTS 4,969,204 A * 11/1990 Melnychuck et al. ........ 382/240
6,327,392 B1 * 12/2001 Li ................................ 382/248

OTHER PUBLICATIONS

"Comparative study of wavelet and DCT decompositions with equivalent quantization and encoding strategies for medical images" by Paul W. Jones et al., Eastman Kodak Company, Health Imaging Systems, pp. 1–12.

"Wavelet Transforms that map integers to integers" by A. Calderbank et al., Aug. 1996.

* cited by examiner

Primary Examiner—Leo Boudreau
Assistant Examiner—Duy M. Dang
(74) Attorney, Agent, or Firm—Pamela R. Crocker

(57) ABSTRACT

A method for producing a compressed digital image from an input digital image is disclosed, wherein the compressed digital image is organized into layers having information that can be extracted in accordance with different desired viewing conditions and resolutions. The input digital image is decomposed to produce a plurality of subbands, each subband having a plurality of subband coefficients. The plurality of subband coefficients of each subband of the decomposed input digital image are quantized to produce a quantized output value for each subband coefficient of each subband. At least one bit-plane is formed from the quantized output values of subband coefficients of each subband. Each bit-plane of each subband in at least one pass is entropy encoded to produce a compressed bit-stream corresponding to each pass, wherein each subband is entropy encoded independently of the other subbands. A visual quality table is provided that specifies a number of expected visual quality levels by providing selectable viewing conditions and resolutions for each expected visual quality level. A minimal set of passes and their corresponding compressed bit-streams that are necessary to satisfy the expected visual quality levels provided in the visual quality table are identified, whereby a user can select different desired viewing conditions and resolutions for each compressed image. The compressed bit-streams corresponding to passes are then ordered into layers from the lowest expected visual quality level to the highest expected visual quality level specified in the visual quality table to produce a compressed digital image, wherein each layer includes the passes and their corresponding compressed bit-streams from the identified minimal set corresponding to the expected visual quality level that have not been included in any lower visual quality layers.

9 Claims, 9 Drawing Sheets

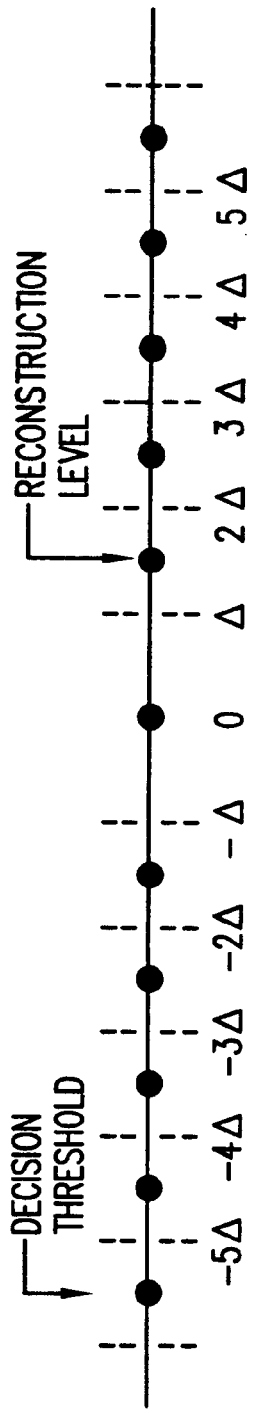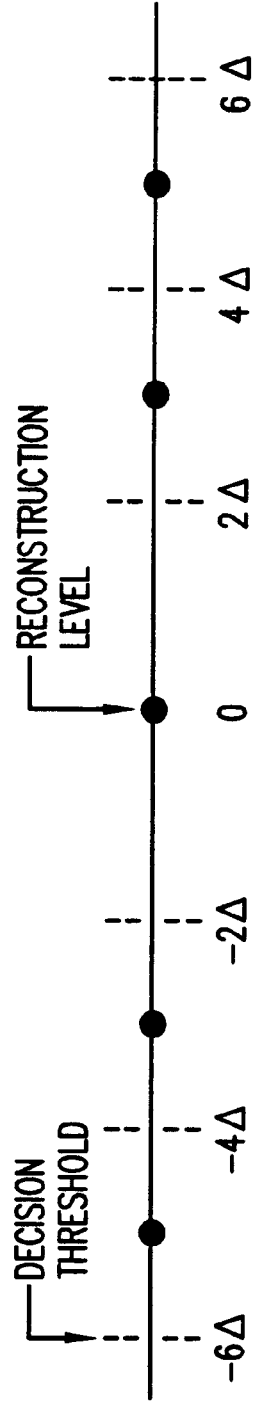

PRODUCING A COMPRESSED DIGITAL IMAGE ORGANIZED INTO LAYERS HAVING INFORMATION RELATING TO DIFFERENT VIEWING CONDITIONS AND RESOLUTIONS

CROSS REFERENCE TO RELATED APPLICATIONS

Reference is made to commonly-assigned U.S. patent application Ser. No. 09/512,731, filed Feb. 24, 2000 entitled "Visually Progressive Ordering Of Compressed Subband Bit-Planes And Rate-Control Based On This Ordering" to Joshi et al., now issued as U.S. Pat. No. 6,650,782; commonly-assigned U.S. Pat. No. 09/656,564 filed Sep. 7, 2000, entitled "Selectively Adjusting the Resolution Levels as the Quality Levels of Digital Images Stored in a Digital Camera Memory" to Rabbani et al.; and commonly-assigned U.S. patent application Ser. No. 09/579,689, filed concurrently herewith, entitled "Producing A Compressed Digital Image Organized Into Layers Corresponding To Increasing Visual Quality Levels And Providing Rate-Control Of Such Compressed Digital Image" to Joshi et al., the disclosures of which are herein incorporated by reference.

FIELD OF INVENTION

This invention describes a method for producing a compressed digital image organized into layers having information relating to different viewing conditions and resolutions.

BACKGROUND OF THE INVENTION

Subband or wavelet bit-plane coding is being used in the proposed JPEG2000 standard, as described in ISO/IEC JTC1/SC29 WG1 N1646, JPEG2000 Part I Final Committee Draft, Version 1.0, March 2000. The JPEG2000 encoder decomposes the image into a hierarchy of resolutions and the compressed data corresponding to a resolution is further divided into a number of quality layers. At any resolution, adding more layers to the compressed bit-stream generally improves the visual quality of the image reconstructed at that resolution and at higher resolutions. The JPEG2000 standard provides a very flexible framework for organizing and ordering the compressed bit-stream. For example, a compressed bit-stream may be resolution-layer-component-position progressive or layer-resolution-component-position progressive. Such bit-streams are also referred to as resolution-scalable and quality-scalable, respectively. It is up to the individual JPEG2000 encoder to arrange the compressed bit-stream in a manner suitable for the intended application.

If the compressed bit-stream is arranged in a resolution-layer-component-position progressive manner, henceforth referred to as resolution-progressive, all the layers corresponding to a lower resolution image appear in the bit-stream earlier than any layers corresponding to higher resolutions. On the other hand, if the compressed bit-stream is arranged in a layer-resolution-component-position progressive manner, henceforth referred to as layer-progressive, layers with lower indices from all resolution levels appear in the bit-stream earlier than any layers with higher indices. Thus, it is not possible for the compressed bit-stream to be resolution-progressive and layer-progressive at the same time. But in some applications, a combination of these two modes may be desirable.

For example, consider a digital camera having four visual quality levels. Suppose that the images are captured at a resolution of 1536 by 1024 pixels, but for the two lowest visual quality levels, the images are stored at the next lower resolution, 768 by 512 pixels. Consider a usage scenario in which the image is compressed at the highest visual quality level, but due to memory constraints it is necessary to truncate the compressed bit-stream so that the image is stored at the lowest visual quality level. If the original compressed bit-stream had been arranged in a layer-progressive manner, the truncated bit-stream would still contain some layers from the higher (1536 by 1024) resolution. This is a waste of memory space because at the lowest visual quality level, the image will be stored at the 768 by 512 resolution. Similarly, suppose that the compressed bit-stream corresponding to the highest visual quality level is arranged in a resolution-progressive manner, and is then truncated to the next lower visual quality level at the same resolution. In this case, the truncated bit-stream may contain layers from the 768 by 512 resolution that are not necessary to achieve the desired visual quality level.

Also consider the situation where the digital camera stores many images on a flash memory card, and includes an image display, such as a color liquid crystal display (LCD), with a limited dynamic range. The LCD displays several "thumbnail size" (e.g., 192 by 128 resolution) images at the same time to allow the user to locate an image of interest. It then displays a single "screennail" size (e.g. 384 by 256 resolution) image of one of the selected thumbnail images. In this situation, if the file is arranged in a layer-progressive manner, it will take time to skip over some layers from the higher (1536 by 1024) resolution in order to locate just the data needed for the lower resolution images. If the data is arranged in a resolution-progressive manner, it will again take time to skip over some of the layers from the 192 by 128 and 384 by 256 resolution levels that are not needed to provide an acceptable image on the low dynamic range camera LCD. As a result, the time required to decode the images will be slow, and the display will not be as responsive to user commands to display a new image as would be desirable.

SUMMARY OF THE INVENTION

Accordingly, an object of the present invention is to provide a method for the formation of layers of a compressed JPEG2000 bit-stream in such a manner that the bit-stream provides partial resolution scalability within a layer-progressive ordering.

This object is achieved by a method for producing a compressed digital image from an input digital image, wherein the compressed digital image is organized into layers having information that can be extracted in accordance with different desired viewing conditions and resolutions, comprising the steps of:

(a) decomposing the input digital image to produce a plurality of subbands, each subband having a plurality of subband coefficients;

(b) quantizing the plurality of subband coefficients of each subband of the decomposed input digital image to produce a quantized output value for each subband coefficient of each subband;

(c) forming at least one bit-plane from the quantized output values of subband coefficients of each subband;

(d) entropy encoding each bit-plane of each subband in at least one pass to produce a compressed bit-stream corresponding to each pass, wherein each subband is entropy encoded independently of the other subbands;

(e) providing a visual quality table that specifies a number of expected visual quality levels by providing selectable viewing conditions and resolutions for each expected visual quality level;

(f) identifying a minimal set of passes and their corresponding compressed bit-streams that are necessary to satisfy the expected visual quality levels provided in the visual quality table, whereby a user can select different desired viewing conditions and resolutions for each compressed image; and (g) ordering the compressed bit-streams corresponding to passes into layers from the lowest expected visual quality level to the highest expected visual quality level specified in the visual quality table to produce a compressed digital image, wherein each layer includes the passes and their corresponding compressed bit-streams from the identified minimal set corresponding to the expected visual quality level that have not been included in any lower visual quality layers.

ADVANTAGES OF THE INVENTION

The present invention provides an advantage in that the compressed bit-stream corresponding to the highest visual quality level can be truncated to achieve any other visual quality level.

The present invention also provides an advantage in that the truncated bit-stream contains only the layers that are necessary to represent the image at the resolution intended for that visual quality level.

BRIEF DESCRIPTION OF THE DRAWINGS

In describing the preferred embodiments of the invention reference will be made to the series of figures and drawings briefly described below.

FIGS. 4A and 4B show graphs of the decision thresholds and reconstruction levels for step-sizes of $\Delta$ and $2\Delta$, respectively, for a uniform scalar quantizer with a deadzone;

There may be additional structures described in the foregoing application that are not depicted on one of the described drawings. In the event such a structure is described, but not depicted in a drawing, the absence of such a drawing should not be considered as an omission of such design from the specification.

DETAILED DESCRIPTION OF THE INVENTION

The present invention relates to compression of a digital image. Although there are other techniques well known in the art, the present invention will be described with respect to the technique set forth in the JPEG2000 image compression standard. Because the proposed JPEG2000 image compression standard specifies how the decoder shall interpret a compressed bit-stream, there are certain inherent restrictions on any JPEG2000 encoder. For example, in Part I of the standard, only certain wavelet filters can be used. The entropy coder is also fixed. These methods are described in ISO/IEC JTC1/SC29 WG1 N1646, JPEG2000 Part I Final Committee Draft, Version 1.0, March 2000. Hence, the present description will be directed in particular to attributes forming part of, or cooperating more directly with, the algorithm in accordance with the present invention. Attributes not specifically shown or described herein may be selected from those described in ISO/IEC JTC1/SC29 WG1 N1646, JPEG2000 Part I Final committee Draft, Version 1.0, March 2000, or otherwise known in the art. In the following description, a preferred embodiment of the present invention would ordinarily be implemented as a software program, although those skilled in the art will readily recognize that the equivalent of such software may also be constructed in hardware. Given the system and methodology as described in the following materials, all such software implementation needed for practice of the invention is conventional and within the ordinary skill in such arts. If the invention is implemented as a computer program, the program may be stored in conventional computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

Figure 1:
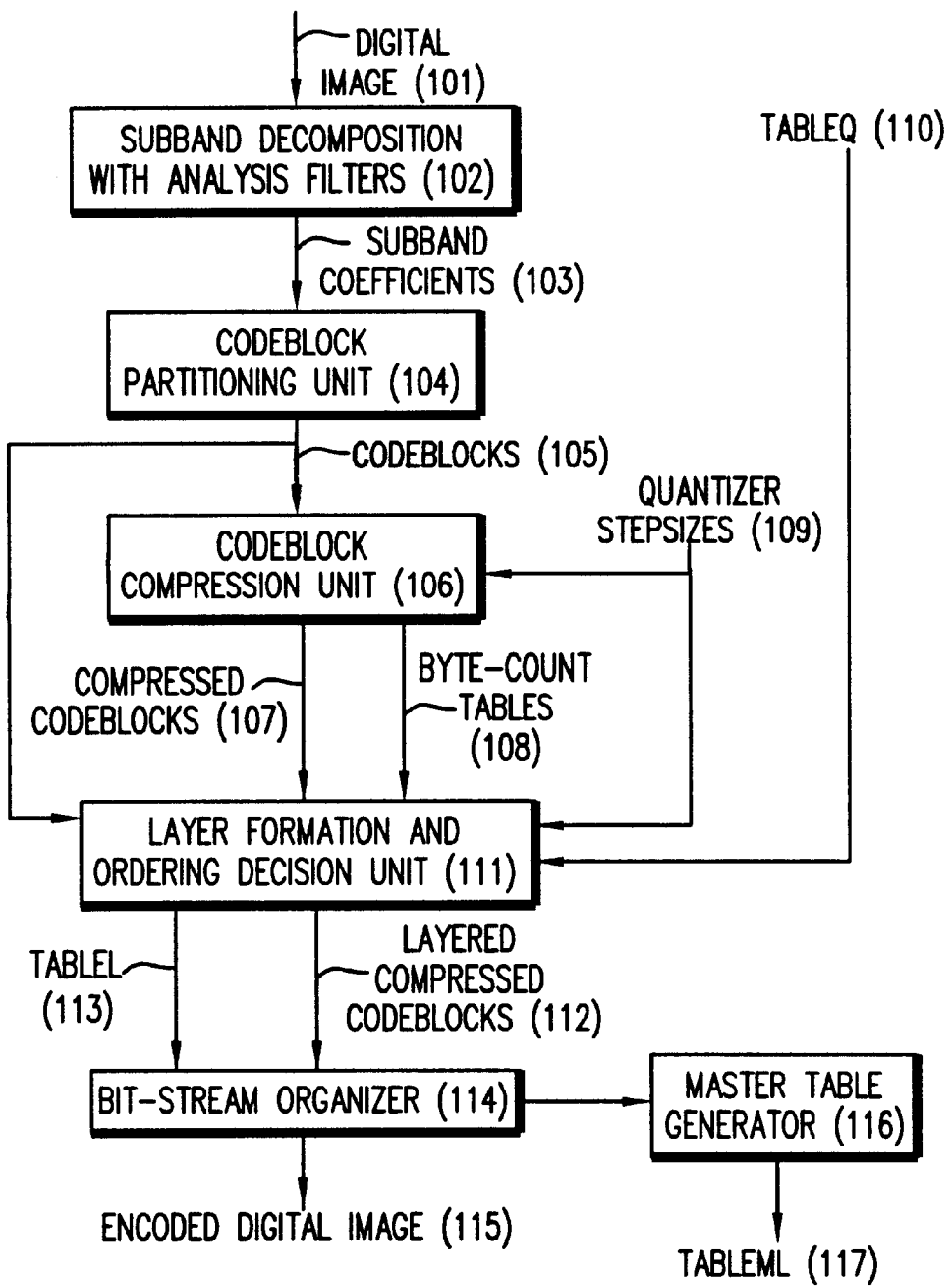
FIG. 1 shows a flow chart of an image encoder according to the present invention.

A flow chart of a JPEG2000 image encoder according to the present invention is shown in FIG. 1. A digital image (101) undergoes subband decomposition (102) by the analysis filters to produce an image representation in terms of subband coefficients (103). If the image has multiple components (e.g., RGB), a luminance-chrominance transformation can be applied to convert it to a YCbCr representation, before the subband decomposition step (102). Also, it is possible to divide each component of the image into multiple tiles. But in this preferred embodiment, only a single tile consisting of the entire image is used. The subband coefficients (103) are partitioned into rectangular blocks by the codeblock partitioning unit (104) to produce one or more codeblocks (105). Those skilled in the art would appreciate that partitioning of the subband coefficients is not necessary if only a single codeblock is used. Each codeblock is compressed by the codeblock compression unit (106) using the appropriate quantizer step-size (109) to produce a compressed codeblock (107) and a byte-count table (108). For each codeblock, the compressed bit-stream (107) and the byte-count table, denoted by TableB (108), are fed to a layer formation and ordering decision unit (111). The other inputs to the layer formation and decision unit (111) are the quantizer step-size (109) used to quantize that codeblock and a table, denoted by TableQ (110), containing information about the desired visual quality levels, intended resolution, and viewing condition parameters for the respective visual quality levels. For each codeblock, the layer formation and ordering decision unit (111) determines how many coding passes should be included in each layer, and produces a layered compressed codeblock (112) and a table, denoted by TableL (113). TableL stores information about the number of coding passes and the corresponding bytes in each layer for that codeblock. The layer formation and ordering decision unit (111) also specifies that the overall bit-stream is to be arranged in a layer-progressive manner. The layered compressed codeblocks (112), TableL (113), and the ordering information are fed to the JPEG2000 bit-stream organizer (114) to produce an encoded digital image (115) that is JPEG2000 compliant. The master table generator (116) generates TableML (117) whose $i^{th}$ entry specifies the number of bytes required to represent the compressed image data corresponding to the first i layers. This information is also contained in the compressed bit-stream, but in some applications it may be advantageous to store the information separately so that it is not necessary to parse the bit-stream for the information.

Figure 2:
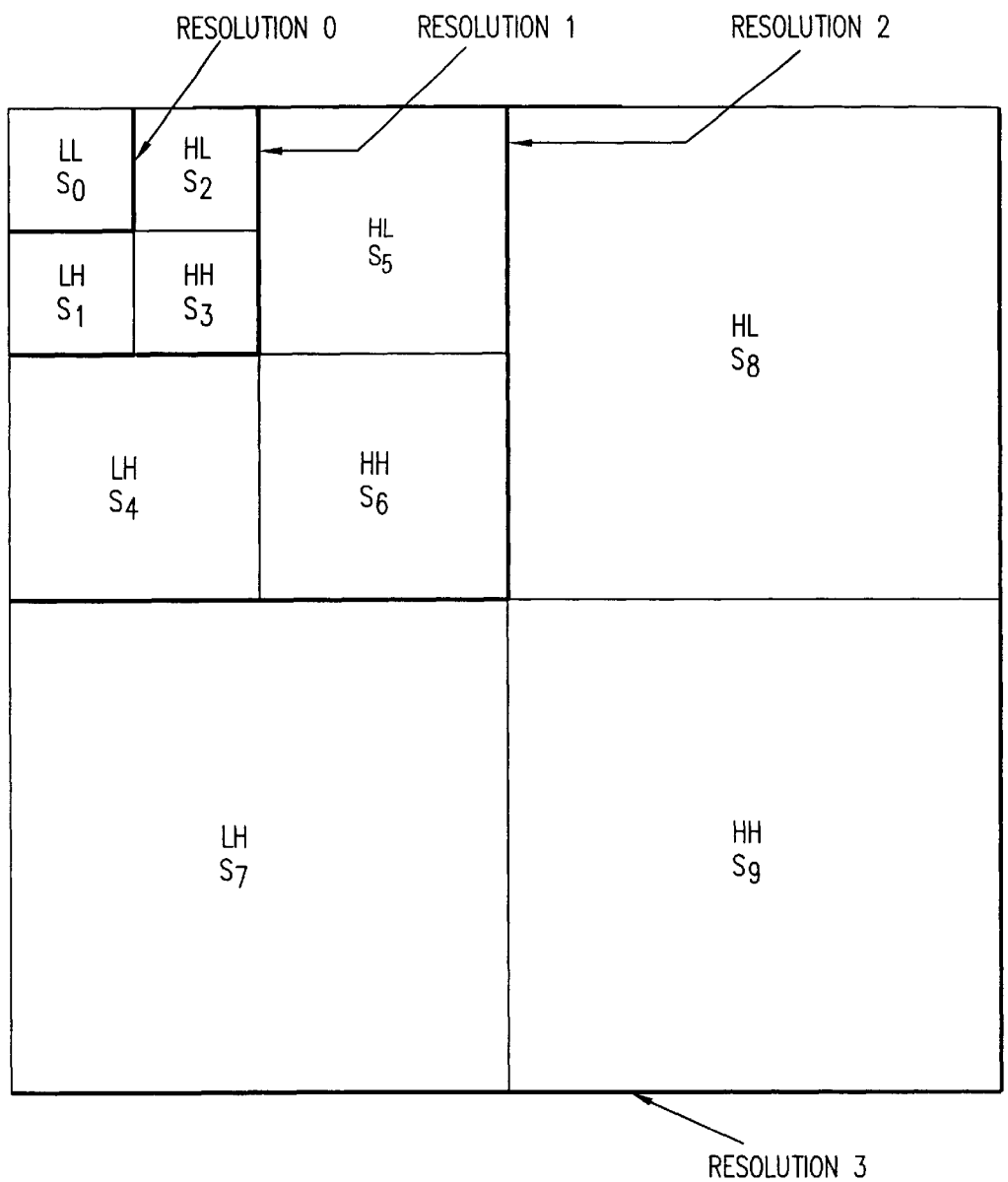
FIG. 2 shows a resolution hierarchy created by a 3 level octave subband decomposition.

The blocks in FIG. 1 will now be described in greater detail. The image undergoes subband decomposition by analysis filters (102). A single level of decomposition splits the image into 4 subbands, denoted by LL, HL, LH, and HH. The first letter indicates the type of filtering employed in the horizontal direction. The second letter indicates the type of filtering employed in the vertical direction. For example, band HL is the result of high-pass filtering in the horizontal direction and low-pass filtering in the vertical direction. In an octave decomposition, the LL band is split recursively. In the preferred embodiment, an R level octave decomposition is used. FIG. 2 shows an example of a 3 level octave decomposition. The subbands are numbered from the lowest frequency to the highest frequency. An R level decomposition generates (R+1) resolutions and (3R+1) subbands, denoted by $S_0, S_1, \ldots, S_{3r}$. An image at resolution r ($0 \leq r \leq R$) can be reconstructed from subbands $S_0, S_1, \ldots, S_{3r}$. If the original image is of size 1024 by 1024, and the decomposition is 3 level octave, images at resolutions 0, 1, 2 and 3 have sizes 128 by 128, 256 by 256, 512 by 512, and 1024 by 1024, respectively.

Figure 3:
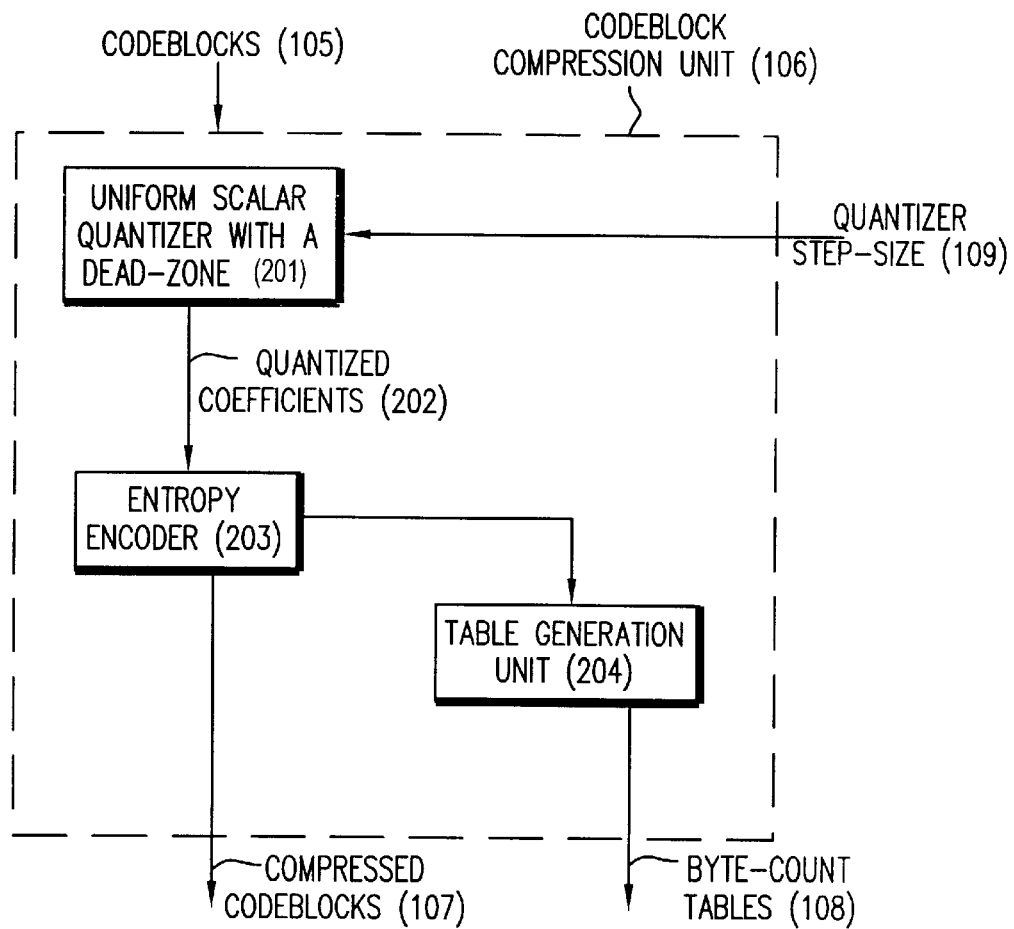
FIG. 3 shows a block diagram of the codeblock compression unit of FIG. 1.

The codeblock partitioning unit (104) shown in FIG. 1 partitions each subband into a number of rectangular codeblocks. The codeblock compression unit (106) is shown in greater detail in FIG. 3. Each codeblock is quantized with a scalar quantizer (201) to produce a sign-magnitude representation of the indices of quantized coefficients (202). Preferably, a uniform scalar quantizer with a dead-zone is used. The decision thresholds and reconstruction levels for this quantizer are shown in FIGS. 4A and 4B. FIG. 4A shows the decision thresholds and reconstruction levels for a step-size of $\Delta$; FIG. 4B shows the decision thresholds and reconstruction levels for a step-size of $2\Delta$. In a preferred embodiment, the reconstruction levels are always at the center of the quantization interval. But those skilled in the art will recognize that this is not necessary. For example, the reconstruction levels can be biased towards zero. The same base quantizer step-size is used for all the codeblocks in a given subband. Let the step-size for subband i be $\Delta_i$. It should be noted that the maximum quantization error, denoted by $E_{max}$, is ($\Delta_i/2$), except for the zero bin which has a maximum quantization error of $\Delta_i$. If the subband analysis and synthesis filters are reversible (R. Calderbank, I. Daubechies, W. Sweldens, and B. -L. Yeo, "Wavelet Transform that Maps Integers to Integers," *Applied and Computational Harmonic Analysis*, vol. 5, no. 3, pp. 332–369, 1998), the quantization step may be entirely absent.

Suppose that the codeblock being processed is from subband i. Then, the samples from the block are quantized with a uniform scalar quantizer with step size $\Delta_i$ as described above. Suppose that the magnitude of the indices of quantized coefficients is represented by a fixed precision of $A_i$ bits. Let the bits be indexed as $1, 2, \ldots, A_i$, where index 1 corresponds to the most significant bit (MSB) and $A_i$ corresponds to the least significant bit (LSB). The $k^{th}$ bit-plane for the codeblock consists of the $k^{th}$ bit from the magnitude representation of all the indices of quantized coefficients from that codeblock. One interesting property of the scalar quantizer being used is that discarding, or zeroing out, the k least significant bits from the magnitude representation of the index of a quantized coefficient from subband i is equivalent to scalar quantization of that coefficient with a step-size of $2^k \Delta_i$. Thus, if the compressed bit-stream corresponding to the codeblock is truncated so that the data corresponding to the last k bit-planes is discarded, it is possible to reconstruct a more coarsely quantized version of the codeblock. This is known as the embedding property. It should be noted that if the last k bit-planes of the magnitude representation of a quantized coefficient are dropped, for reconstruction at the decoder, the reconstruction levels for the quantizer with a step-size of $2^k \Delta_i$ are used.

For the purpose of entropy coding, a bit-plane for a codeblock is said to be significant if any of the previous bit-planes were significant or the bit-plane has at least one non-zero bit. The entropy encoder (203) codes each bit-plane for the codeblock in one or more coding passes. For example, the most significant bit-plane is encoded using a single coding pass. The rest of the bit-planes for the codeblock are encoded using three coding passes. In JPEG2000, the MQ arithmetic coder is used as the entropy coder. The table generation unit (204) generates a byte-count table (108) for each codeblock. The $m^{th}$ entry in the table corresponds to the number of bytes needed to include coding passes $1, 2, \ldots,$ m of the codeblock in the bit-stream.

The layer formation and ordering decision unit (111) determines the number of coding passes to be included in each layer so that the visual quality criteria as specified by TableQ (110) are met. TableQ (110) stores information about the desired visual quality levels. The $1^{st}$ column entry of the $j^{th}$ row, TableQ[j][1], specifies the resolution at which the image at visual quality level j will be stored. The $2^{nd}$ column entry, TableQ[j][2], specifies the viewing condition parameters applicable for visual quality level j. As will be described shortly, the viewing condition parameters determine the effective quantizer step-size to be used in each subband and thus, determine the visual quality level for the reconstructed image. The number of layers, L, for each codeblock is equal to the number of visual quality levels in TableQ.

For a given visual quality level and the corresponding viewing condition parameters, for each subband, the layer formation and ordering decision unit (111) calculates the quantizer step-size that will result in just noticeable distortion in the reconstructed image. This is accomplished by using the two-dimensional Contrast Sensitivity Function (CSF) of the human visual system (HVS). The CSF model described in Jones et al., "Comparative study of wavelet and DCT decomposition with equivalent quantization and encoding strategies for medical images", *Proc. SPIE Medical Imaging* '95, vol. 2431, pp. 571–582, which is incorporated herein by reference, models the sensitivity of the human visual system as a function of the two-dimensional (2-D) spatial frequency, and it depends on a number of parameters, such as viewing distance, light level, color, image size, eccentricity, noise level of the display, etc. These parameters will be referred to as viewing condition parameters. The frequency dependence of the CSF is commonly represented using cycles/degree of visual subtense. The CSF can be mapped to other units, such as cycles/mm, for a given viewing distance (i.e., the distance from the observer to the displayed image).

The 2-D CSF value for subband i is denoted by $CSF(F_i, VC)$, where VC refers to the viewing condition parameters which include the intended viewing distance, the ambient light level, the display noise level, and the dots per inch for the display. $F_i$ represents the 2-D spatial frequency (in cycles/mm) associated with subband i. In a preferred embodiment, $F_i$ is chosen to be the center of the frequency range nominally associated with subband i. As described in the Jones et al. paper, if subband i is quantized with a uniform scalar quantizer having a dead-zone, the step-size $Q_i(VC)$ that results in just noticeable distortion in the reconstructed image for viewing condition parameters VC is $$Q_i(VC) = \frac{1}{C \times MTF(F_i) \times G_i \times CSF(F_i, VC)},$$

where $MTF(F_i)$ is the display MTF at frequency $F_i$, C is the contrast per code-value of the display device, and $G_i$ is the gain factor that represents the change in contrast for the reconstructed image for one code-value change in a coefficient of subband i. The gain factor depends on the level and orientation of the subband, as well as the subband synthesis filters. Compared to the paper by Jones et al, a factor of 0.5 is missing from the denominator. This is due to the fact that for uniform scalar quantizer with a dead-zone, the maximum possible distortion, $E_{max}$, is equal to the step-size, as opposed to half the step-size for a uniform scalar quantizer in the absence of a dead-zone.

The viewing condition parameters are pre-specified for each visual quality level. Images stored at higher visual quality levels are generally viewed under more exacting conditions, e.g. smaller intended viewing distances. In some cases, the viewing condition parameters may not correspond exactly to the actual viewing conditions. For example, suppose that a digital camera captures images at a high enough resolution to make 5 by 7 inch prints. Furthermore, suppose that three visual quality levels, good, better and best, are offered at that resolution. If the prints are to be viewed at a viewing distance of 10 inches, the intended viewing distance for the best quality is specified to be 10 inches. The viewing distances for the remaining two visual quality levels are set to higher values, e.g., 12 inches for better visual quality and 16 inches for good visual quality. All the remaining viewing condition parameters are the same for the three quality levels. This results in higher quantizer step-sizes for the good and better visual quality levels, resulting in supra threshold quantization artifacts in the reconstructed images. The visual distortion for the image reconstructed at the best visual quality level is just noticeable. Similarly the display noise levels can be increased beyond the actual value while keeping the other viewing condition parameters the same, to provide lower visual quality levels.

Now consider a codeblock from subband i quantized with a step-size $\Delta_i$. Suppose that m coding passes for the codeblock are included in the compressed bit-stream, and the codeblock is reconstructed from the m coding passes. Let $E_{max}$ be the maximum absolute difference between the original codeblock and the reconstructed codeblock. The codeblock can be thought of as being quantized by a uniform scalar quantizer with a dead-zone having a step-size of $E_{max}$. In this case the effective step-size is $E_{max}$. Assume that for the codeblock from subband i, $P_{(j-1)}$ coding passes have been included in coding layers 1,2, . . . , (j−1), and it is necessary to determine the number of coding passes to be included in layer j so that the visual quality level j is attained (or exceeded) by including the first j layers in the bit-stream. The quantizer step-size $Q_i(VC_j)$ that results in just noticeable distortion in the reconstructed image is calculated. Here $VC_j$ refers to the viewing condition parameters at visual quality level j. Then, for coding passes $P_{(j-1)}$, $P_{(j-1)}+1$, . . . etc., the effective quantizer step-size is calculated. Suppose that at pass m, the effective quantizer step-size becomes less than or equal to $Q_i(VC_j)$, then $P_j$ is set to m. This means that $(m-P_{(j-1)})$ additional coding passes are required in the $j^{th}$ layer of that codeblock. This process is repeated for each codeblock from each subband, and for each visual quality level.

It is possible that some layers in a codeblock may contain no data. For example, consider that an image is to be stored at visual quality level 3, and let the corresponding resolution be r. Now, suppose for a codeblock from subband i, the number of coding passes to be included in layer 3 is to be determined. As described previously, if i is greater than 3r, subband i is not necessary to reconstruct the image at resolution r. So no data is included in layer 3 of codeblocks belonging to subband i.

Figure 5:
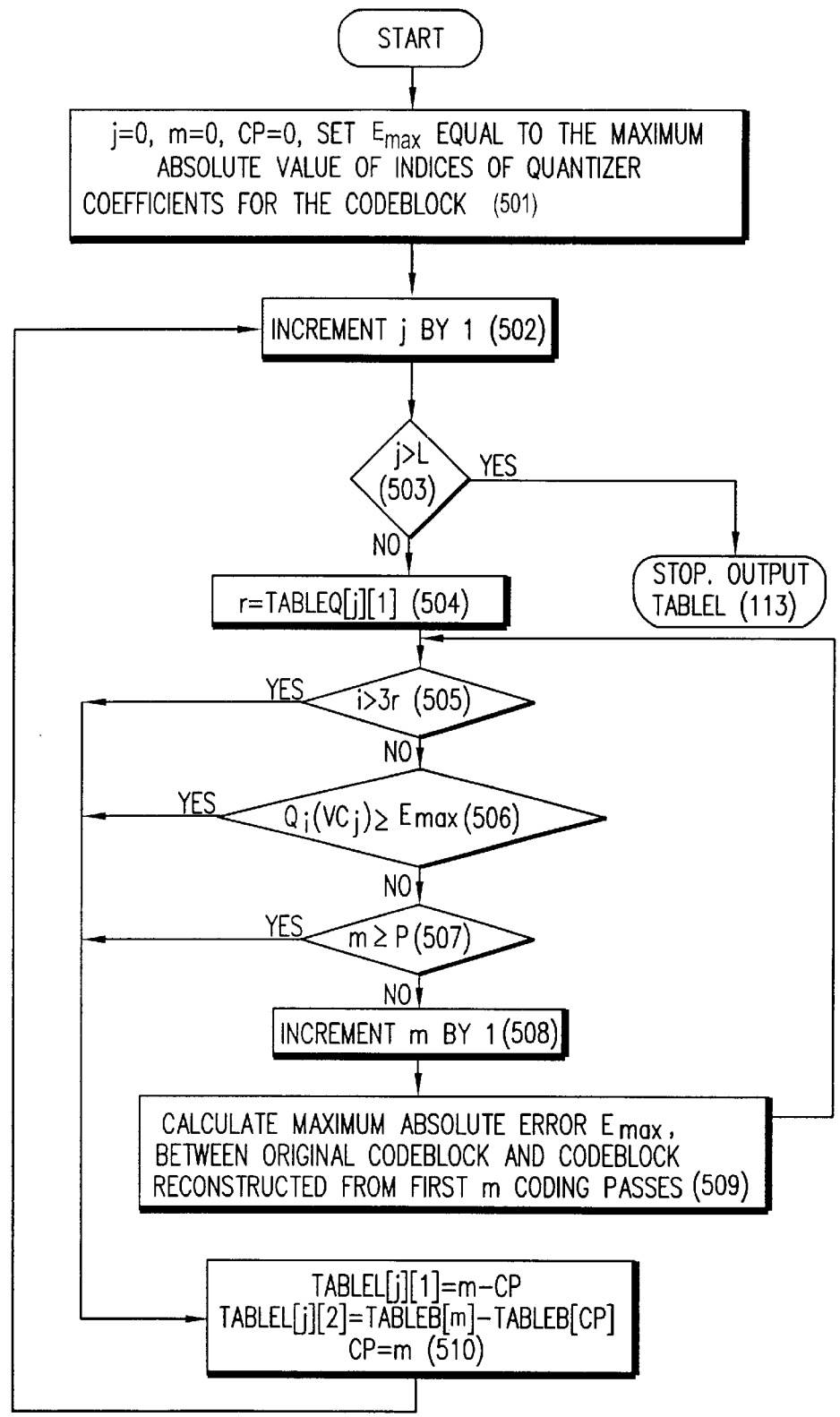
FIG. 5 shows a flow chart of the "layer formation and ordering decision unit" of FIG. 1.

A flow chart for the layer formation and ordering decision unit (111) is shown in FIG. 5. Let the number of layers for the codeblock be L, and the total number of coding passes for the codeblock be P. The inputs to the layer formation and ordering decision unit are: 1) The visual quality table, TableQ (110), with L entries, 2) the original codeblock (105), 3) the compressed bit-stream corresponding to that codeblock (107), and 4) the byte-count table, denoted by TableB (108) for the codeblock. The layer formation and ordering unit (111) generates a table, denoted by TableL (113), that has L rows and 2 columns. The $1^{st}$ entry from row j denotes the number of coding passes belonging to layer j, and the $2^{nd}$ entry indicates the number of bytes in layer j of that codeblock.

The initializer unit (501) initializes j, m, and the number of cumulative passes, CP, to zero. It also initializes the maximum absolute error, $E_{max}$, to the maximum absolute value of the indices of quantized coefficients for that codeblock. In step (502), j is incremented by 1. Then, the comparison unit (503) compares j against the number of layers, L. If j is greater than L, all the layers have been formed, and the process is stopped after writing out TableL (113). Otherwise, the process is continued. In step (504), the resolution r is set to TableQ[j][1]. A second comparison unit (505) compares the index of the subband to which the codeblock belongs, i, with 3r. If i is greater than 3r, subband i is not needed to reconstruct the image at resolution r. The flow-control is passed to step (510) and the $j^{th}$ row of TableL is set to 0. This signifies that no coding passes from the codeblock are included in layer j. If i is less than or equal to 3r, another comparison unit (506) compares $E^{max}$ with the quantizer step-size, $Q_i(VC_j)$, that produces just noticeable distortion for viewing condition parameters corresponding to visual quality level j. If $E_{max}$ is less than or equal to $Q_i(VC_j)$, the flow-control passes to step (510), and all coding passes up to and including m are included in layer j. Otherwise, m is compared against the total number of passes, P (507). If m is greater than or equal to P, the flow-control skips to step (510). Otherwise, m is incremented by 1 (508). Then, the codeblock is reconstructed by using compressed data corresponding to the first m coding passes, and the maximum absolute difference, $E_{max}$, between the original codeblock and the reconstructed codeblock is found (509). After this, the flow-control returns to step (506). In step (510), TableL[j][1] is set to (m-CP) and TableL[j][2] is set to (TableB[m]-TableB[CP]). Also, the number of cumulative passes is set to m. Then, the flow-control returns to step (502). Thus, steps 506 through 509 have the effect of identifying a minimal set of passes and their corresponding compressed bit-streams that are necessary to satisfy each expected visual quality level provided in the visual quality table, TableQ (110).

It should be noted that the step-size used to quantize the codeblock should be sufficiently small so that when all the coding passes for the codeblock are included in the bit-stream, the maximum quality level specified in the visual quality table, TableQ (110), can be achieved or exceeded.

Figure 6:
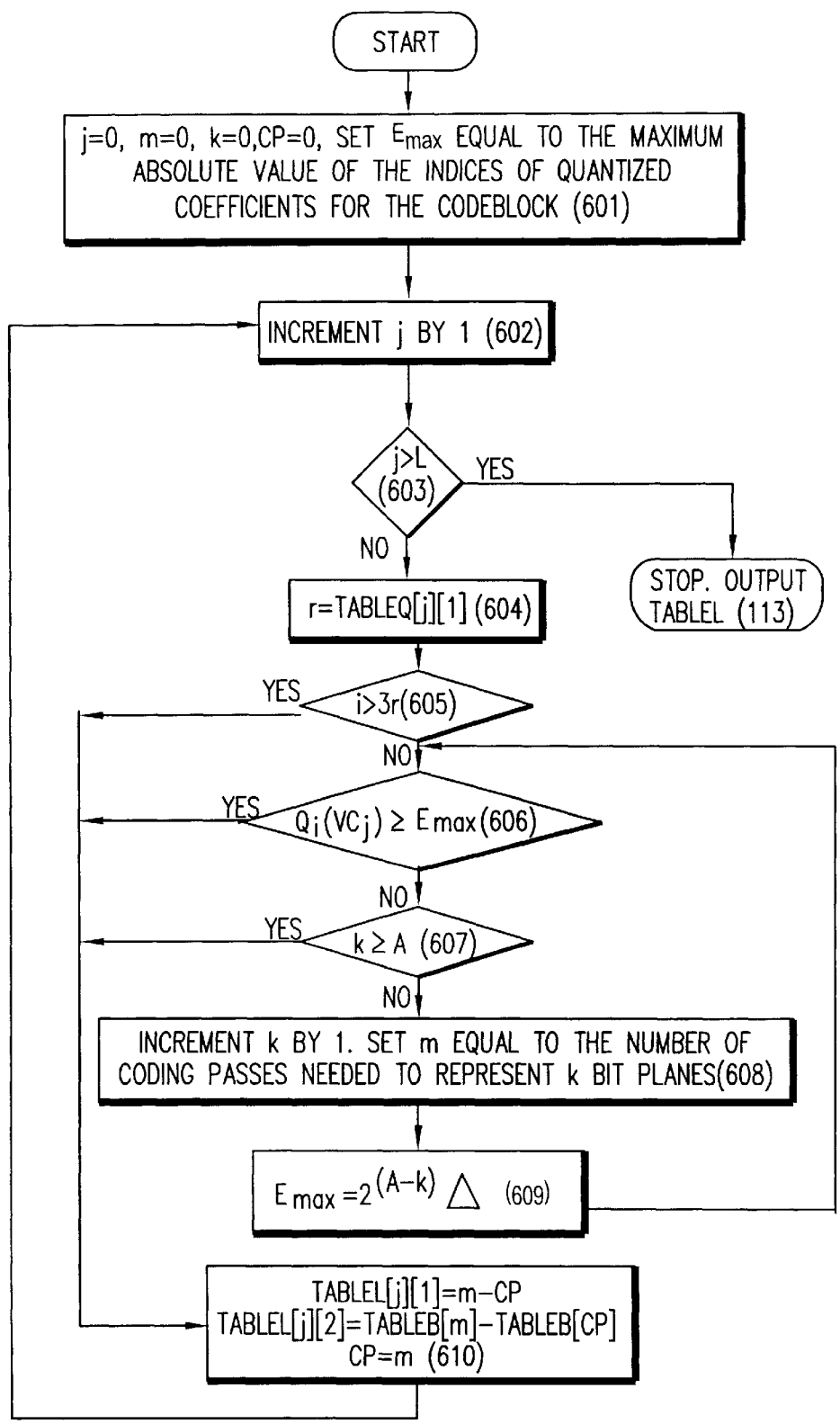
FIG. 6 shows a flow chart of another embodiment of the "layer formation and ordering decision unit" of FIG. 1.

Another embodiment of the layer formation and ordering decision unit is shown in FIG. 6, where an additional constraint is placed on the formation of the layers. The constraint is that the layer boundaries for a block must coincide with the bit-plane boundaries. As discussed previously, let the magnitudes of the indices of quantized codeblock coefficients, quantized with a step-size of Δ, be represented by a fixed precision of A bits. Let the bits be indexed as 1, ... ,A, with index 1 representing the MSB. Now suppose that the k least significant bit-planes of the codeblock are discarded. Then, the effective quantizer step-size for the codeblock is ($2^k$ Δ). Instead of calculating the maximum absolute error, $E_{max}$, between the original codeblock and the reconstructed codeblock as done previously, $E_{max}$ is set equal to $2^k$ Δ.

In the alternate embodiment, the initializer unit (601) also initializes k to 0. Steps 602–606 are identical to steps 502–506. In step (607), k is compared with A, the total number of bit-planes for the codeblock. If k is greater than or equal to A, the flow-control passes to step (610). Otherwise, in step (608), k is incremented by 1, and m is updated so that m represents the number of coding passes needed to represent the first k bit-planes. In step (609), the effective step-size corresponding to retaining only the first k bit-planes, ($2^{(A-k)}$ Δ), is calculated, and $E_{max}$ is set to this value. Step 610 is identical to steps 510. Thus, steps 606 through 609 have the effect of identifying a minimal set of passes and their corresponding compressed bit-streams that are necessary to satisfy each expected visual quality level provided in the visual quality table, TableQ (110).

Figure 7:
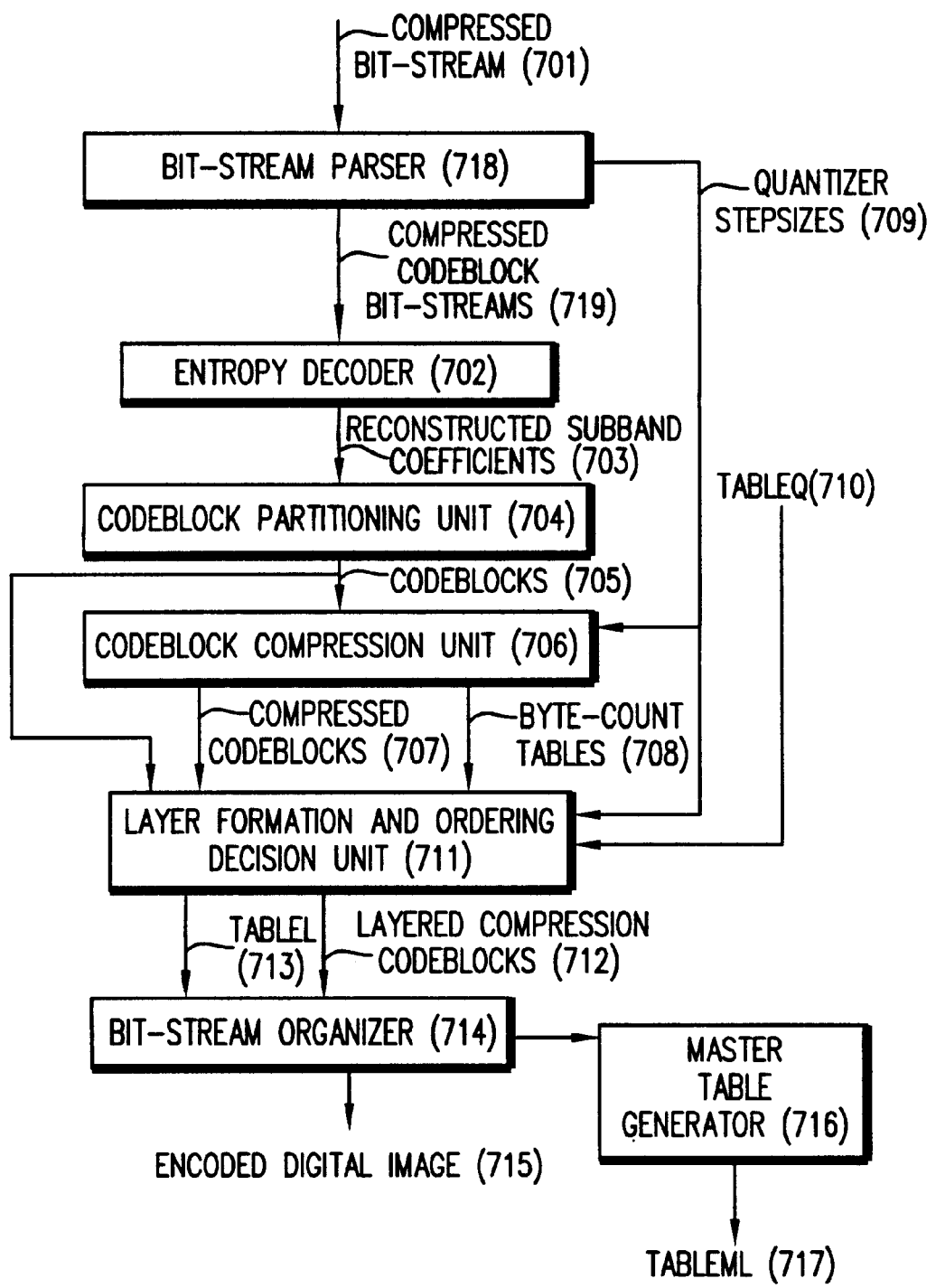
FIG. 7 shows a flow chart for reconfiguring a compressed bit-stream to provide partial resolution scalability within a layer-progressive ordering.

Another embodiment of the invention is shown in FIG. 7. A compressed bit-stream (701) produced by a JPEG2000 encoder is passed through a JPEG2000 bit-stream parser (718) to produce compressed bit-stream corresponding to each codeblock (719). The bit-stream parser also extracts information about quantizer step-sizes (709). Each compressed codeblock bit-stream is passed through an entropy decoder (702) to produce quantized subband coefficients (703). Steps 704–717 are exactly identical to the corresponding steps 104–117. It should be noted that if the base quantizer step-sizes used to produce the original JPEG2000 bit-stream are coarse, it may not be possible to achieve all the visual quality levels from the visual quality table (710).

Figure 8:
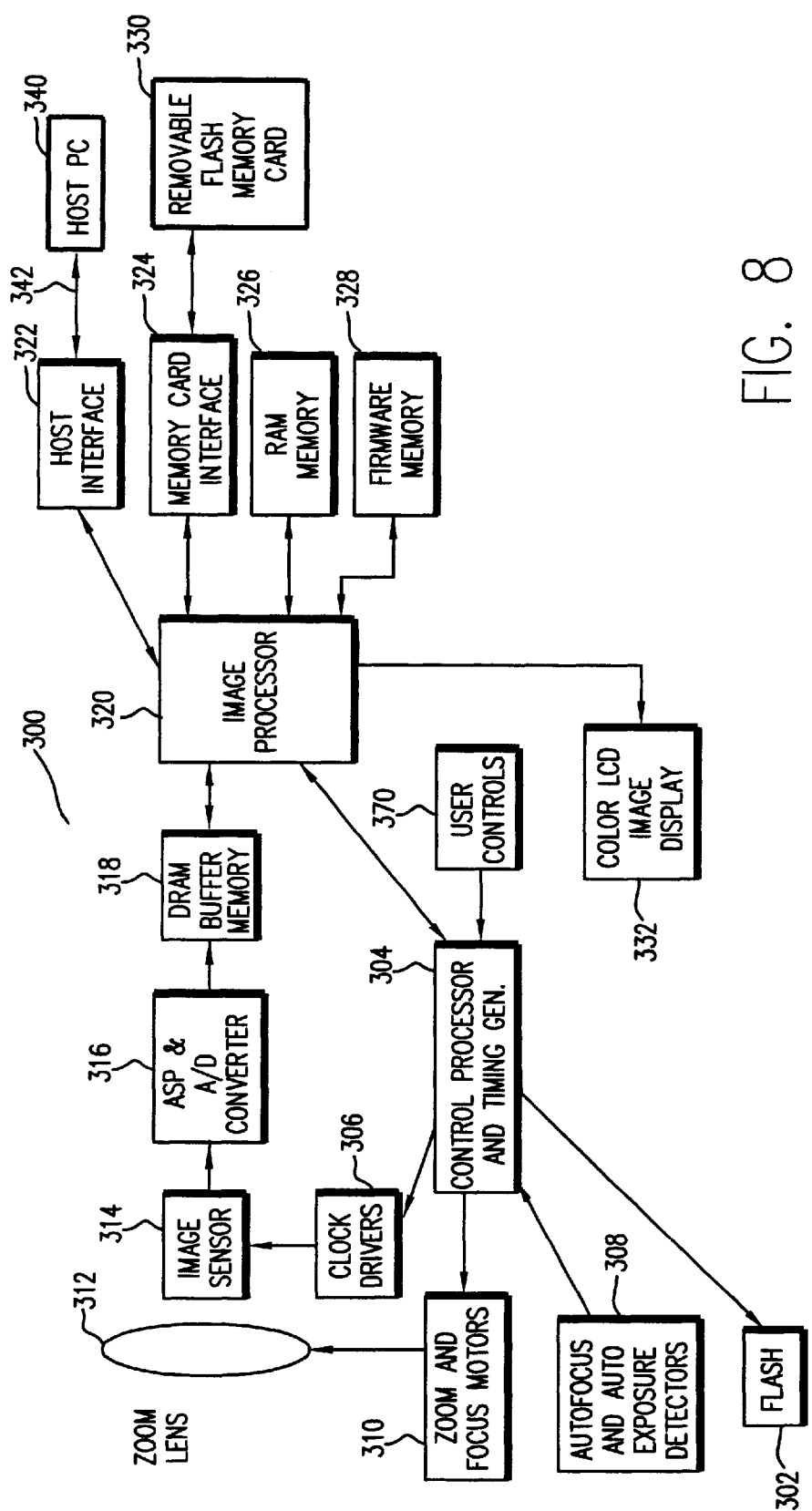
FIG. 8 shows a block diagram of a digital camera system including a digital camera and a digital computer which can utilize the present invention.

The invention can be incorporated into a digital still camera 300 shown in FIG. 8. The digital still camera 300 produces digital images that are stored on a removable memory card 330. The digital still camera 300 includes a zoom lens 312 having zoom and focus motor drives 310 and an adjustable aperture and shutter (not shown). The user composes the image using an optical viewfinder 311 and a zoom lens control switch 372 (shown in FIG. 9). The zoom lens 312 focuses light from a scene (not shown) on an image sensor 314, for example, a single-chip color CCD image sensor, using the well-known Bayer color filter pattern. The image sensor 314 is controlled by clock drivers 306. The zoom and focus motors 310 and the clock drivers 306 are controlled by control signals supplied by a control processor and timing generator circuit 304. When the user depresses a shutter button 374 to take a picture, the control processor and timing generator 304 receives inputs from autofocus and autoexposure detectors 308 and controls a flash 302. The analog output signal from the image sensor 314 is amplified and converted to digital data by an analog signal processing (ASP) and analog-to-digital (A/D) converter circuit 316. The digital data is stored in a DRAM buffer memory 318 and subsequently processed by a processor 320 controlled by the firmware stored in a firmware memory 328, which can be flash EPROM memory.

The processed digital image file is provided to a memory card interface 324 which stores the digital image file on the removable memory card 330. The processor 320 performs color interpolation followed by color and tone correction, in order to produce rendered sRGB image data. The rendered sRGB image data is then compressed using the methods described earlier and stored as a JPEG2000 image file on the removable memory card 330. The =processor 320 also creates a "screennall" size image that is stored in RAM memory 326 and supplied to the color LCD image display 332, which displays the captured image for the user to review.

Figure 9:
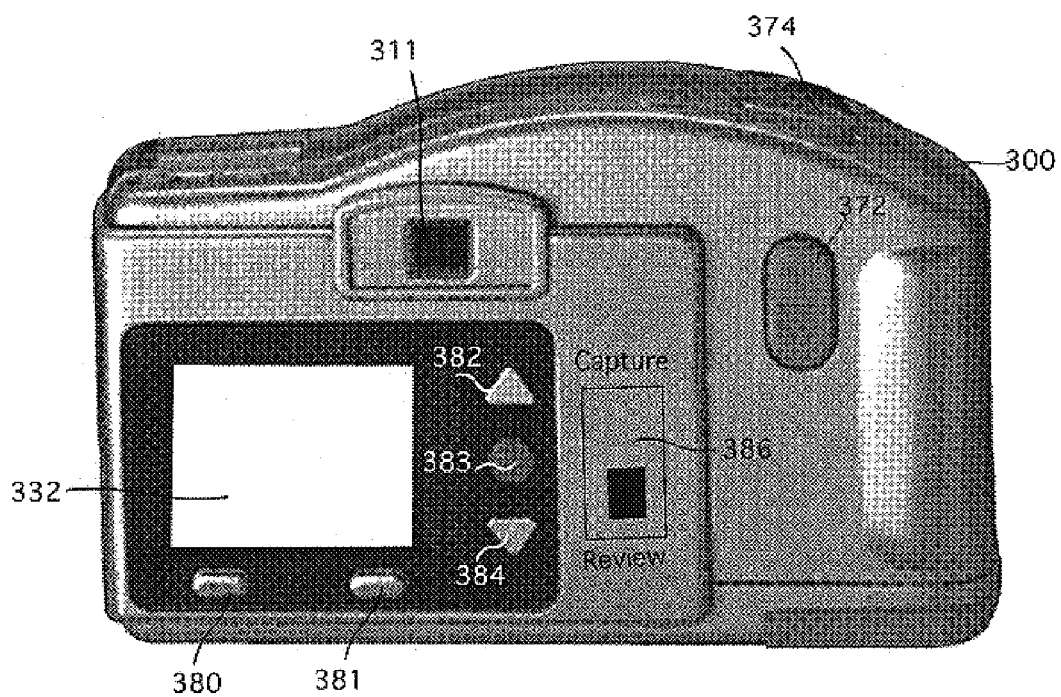
FIG. 9 shows the back of the digital camera depicted in FIG. 8, including the liquid crystal display (LCD).

The graphical user interface displayed on the color LCD image display 332 is controlled by user interface switches 380, 381, 382, 383, 384, and 386 shown in FIG. 9. After a series of images has been taken with the switch 386in the capture position, the switch 386 can be moved to the review position so that the captured pictures can be reviewed on the color LCD image display 332.

Suppose that in our earlier example, the digital still camera 300 has 2 visual quality levels (e.g., good and best) at the 192 by 128 (thumbnail) resolution and the 384 by 256 (screennail) resolution. Furthermore, the digital still camera 300 has three visual quality levels (good, better, and best) each at the 768 by 512 (email) resolution and 1536 by 1024 (print) resolution. Then, the compressed image generated by a JPEG2000 encoder according to the preferred embodiment has 10 quality layers. The JPEG2000 decoder can decode just the first quality layer to display a "good" 192 by 128 thumbnail image. Similarly, the JPEG2000 decoder can decode the first 3 quality layers to obtain a "best" 384 by 256 image and so on.

After a series of images have been taken and stored on the removable memory card 330, the removable memory card 330 can be inserted into a memory card reader (not shown) in the user's host computer 340. Alternatively, an interface cable 342 can be used to connect between the host interface 322 in the digital still camera 300 and the corresponding camera interface in the host computer 340. The interface cable 342 may conform to, for example, the well-know universal serial bus (USB) interface specification.

Initially, the user may wish to download "better" quality 768 by 512 resolution images. In that case, only the first 6 quality layers are transferred from the digital still camera 300 to the host computer 340. This may be sufficient resolution for emailing the image. The invention reduces the download time by only transferring the quality layers necessary to obtain a user-specified quality and resolution. The user may decide that he would like to print the image at the highest possible quality. In that case, the remaining 4 quality layers are transferred from the digital still camera 300 to the host computer 340.

Further modification and variation can be made to the disclosed embodiments without departing from the subject and spirit of the invention as defined in the following claims. Such modifications and variations, as included within the scope of these claims, are meant to be considered part of the invention as described.

What is claimed is:

1. A method for producing a compressed digital image from an input digital image, wherein the compressed digital image is organized into layers having information that can be extracted in accordance with different desired viewing conditions and resolutions, comprising the steps of:
    (a) decomposing the input digital image to produce a plurality of subbands, each subband having a plurality of subband coefficients;
    (b) quantizing the plurality of subband coefficients of each subband of the decomposed input digital image to produce a quantized output value for each subband coefficient of each subband;
    (c) forming at least one bit-plane from the quantized output values of subband coefficients of each subband;
    (d) entropy encoding each bit-plane of each subband in at least one pass to produce a compressed bit-stream corresponding to each pass, wherein each subband is entropy encoded independently of the other subbands;
    (e) providing a visual quality table that specifies a number of expected visual quality levels by providing selectable viewing conditions and resolutions for each expected visual quality level;
    (f) identifying a minimal set of passes and their corresponding compressed bit-streams that are necessary to satisfy the expected visual quality levels provided in the visual quality table, whereby a user can select different desired viewing conditions arid resolutions for each compressed image; and
    (g) ordering the compressed bit-streams corresponding to passes into layers from the lowest expected visual quality level to the highest expected visual quality level specified in the visual quality table to produce a compressed digital image, wherein each layer includes the passes and their corresponding compressed bit-streams from the identified minimal set corresponding to the expected visual quality level that have not been included in any lower visual quality layers.

2. The method according to claim 1 further including the step of producing a byte-count table that contains the number of bytes for the compressed bit-stream corresponding to each pass of each bit-plane of each subband, and wherein the ordering step includes using such byte-count table to identify the number of bytes sufficient to satisfy each expected visual quality level.

3. The method according to claim 1 wherein the identifying step is performed using a model of the contrast sensitivity function for the human visual system.

4. A computer program product for causing a computer to perform the method of claim 1.

5. A method for producing a compressed digital image from an input digital image, wherein the compressed digital image is organized into layers having information that can be extracted in accordance with different desired viewing conditions and resolutions, comprising the steps of:
    (a) decomposing the input digital image to produce a plurality of subbands, each subband having a plurality of subband coefficients;
    (b) quantizing the plurality of subband coefficients of each subband of the decomposed input digital image to produce a quantized output value for each subband coefficient of each subband;
    (c) partitioning each subband into a plurality of codeblocks;
    (d) forming at least one bit-plane from the quantized output values of subband coefficients of each codeblock of each subband;
    (e) entropy encoding each bit-plane of each codeblock for each subband in at least one pass to produce a compressed bit-stream corresponding to each pass, wherein each codeblock is entropy encoded independently of the other codeblocks;
    (f) providing a visual quality table that specifies a number of expected visual quality levels by providing selectable viewing conditions and resolutions for each expected visual quality level;
    (g) identifying a minimal set of passes and their corresponding compressed bit-streams that are necessary to satisfy the expected visual quality levels provided in the visual quality table, whereby a user can select different desired viewing conditions and resolutions for each compressed image; and
    (h) ordering the compressed bit-streams corresponding to passes from the lowest expected visual quality level to the highest expected visual quality level specified in the visual quality table to produce a compressed digital image, wherein each layer includes the passes and their corresponding compressed bit-streams from the identified minimal set corresponding to the expected visual quality level that have not been included in any lower visual quality layers.

6. The method according to claim 5 further including the step of producing a byte-count table that contains the number of bytes for the compressed bit-stream corresponding to each pass of each bit-plane of each subband, and wherein the ordering step includes using such byte-count table to identify the number of bytes sufficient to satisfy each expected visual quality level.

7. The method according to claim 5 wherein the identifying step is performed using a model of the contrast sensitivity function for the human visual system.

8. A computer program product for causing a computer to perform the method of claim 5.

9. A digital camera for capturing an image of a scene and for producing a compressed digital image from an input digital image, wherein the compressed digital image is organized into layers having information that can be extracted in accordance with different desired viewing conditions and resolutions, comprising;
    (a) image sensor means for capturing an image of the scene and producing a digital image representative of the scene;
    (b) means for processing the digital image to provide a processed digital image;
    (c) decomposing the processed digital image to produce a plurality of subbands, each subband having a plurality of subband coefficients;
    (d) quantizing the plurality of subband coefficients of each subband of the decomposed digital image to produce a quantized output value for each subband coefficient of each subband;

(e) partitioning each subband into a plurality of codeblocks;

(f) forming at least one bit-plane from the quantized output values of subband coefficients of each codeblock of each subband;

(g) entropy encoding each bit-plane of each codeblock for each subband in at least one pass to produce a compressed bit-stream corresponding to each pass, wherein each codeblock is entropy encoded independently of the other codeblocks;

(h) providing a visual quality table that specifies a number of expected visual quality levels by providing selectable viewing conditions and resolutions for each expected visual quality level;

(i) identifying a minimal set of passes and their corresponding compressed bit-streams that are necessary to satisfy the expected visual quality levels provided in the visual quality table, whereby a user can select different desired viewing conditions and resolutions for each compressed image;

(j) ordering the compressed bit-streams corresponding to passes from the lowest expected visual quality level to the highest expected visual quality level specified in the visual quality table to produce a compressed digital image, wherein each layer includes the passes and their corresponding compressed bit-streams from the identified minimal set corresponding to the expected visual quality level that have not been included in any lower visual quality layers; and (k) storage means for storing the compressed digital image.

* * * * *